(12) United States Patent
Knudson et al.

(10) Patent No.: US 11,282,528 B2
(45) Date of Patent: Mar. 22, 2022

(54) DIGITAL ASSISTANT ACTIVATION BASED ON WAKE WORD ASSOCIATION

(71) Applicant: Lenovo (Singapore) Pte. Ltd., Singapore (SG)

(72) Inventors: Ryan Charles Knudson, Durham, NC (US); Russell Speight VanBlon, Raleigh, NC (US); Roderick Echols, Chapel Hill, NC (US); Jonathan Gaither Knox, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 484 days.

(21) Appl. No.: 15/676,106

(22) Filed: Aug. 14, 2017

(65) Prior Publication Data
US 2019/0051307 A1 Feb. 14, 2019

(51) Int. Cl.
| | | |
|---|---|---|
| *G10L 17/24* | (2013.01) | |
| *G10L 15/22* | (2006.01) | |
| *G10L 15/08* | (2006.01) | |

(52) U.S. Cl.
CPC ............. *G10L 17/24* (2013.01); *G10L 15/08* (2013.01); *G10L 15/22* (2013.01); *G10L 2015/088* (2013.01); *G10L 2015/223* (2013.01)

(58) Field of Classification Search
USPC .................................. 704/231–257, 270–275
See application file for complete search history.

(56) References Cited

U.S. PATENT DOCUMENTS

| | | | | |
|---|---|---|---|---|
| 5,983,186 A | * | 11/1999 | Miyazawa | G10L 15/26 704/233 |
| 6,070,140 A | * | 5/2000 | Tran | G06F 1/3203 704/275 |
| 6,163,768 A | * | 12/2000 | Sherwood | G10L 15/063 704/235 |
| 8,452,597 B2 | * | 5/2013 | Bringert | G10L 15/28 704/231 |
| 9,275,637 B1 | * | 3/2016 | Salvador | G10L 15/01 |
| 2014/0047001 A1 | * | 2/2014 | Phillips | H04L 65/403 709/202 |
| 2014/0281944 A1 | * | 9/2014 | Winer | G06F 17/2735 715/259 |
| 2017/0256270 A1 | * | 9/2017 | Singaraju | G10L 25/84 |

* cited by examiner

*Primary Examiner* — Jesse S Pullias

(74) *Attorney, Agent, or Firm* — Ference & Associates LLC

(57) ABSTRACT

One embodiment provides a method, including: receiving, at an information handling device, user input comprising a potential wake word; determining, using a processor, whether the potential wake word is associated with a stored wake word; and responsive to determining that the potential wake word is associated with the stored wake word, activating, based on the potential wake word, a digital assistant associated with the information handling device. Other aspects are described and claimed.

20 Claims, 3 Drawing Sheets

DIGITAL ASSISTANT ACTIVATION BASED ON WAKE WORD ASSOCIATION

BACKGROUND

Information handling devices ("devices"), for example smart phones, tablet devices, smart speakers, laptop and personal computers, and the like, may be capable of receiving command inputs and providing outputs responsive to the inputs. Generally, a user interacts with a voice input module, for example embodied in a digital assistant through use of natural language. Conventional digital assistants need to be activated, or "waken", by way of a predetermined input, for example, by audibly saying the virtual assistant's "name", by provided a predetermined gesture, by audibly saying a particular phrase, or the like.

BRIEF SUMMARY

In summary, one aspect provides a method, comprising: receiving, at an information handling device, user input comprising a potential wake word; determining, using a processor, whether the potential wake word is associated with a stored wake word; and responsive to determining that the potential wake word is associated with the stored wake word, activating, based on the potential wake word, a digital assistant associated with the information handling device.

Another aspect provides an information handling device, comprising: a processor; a memory device that stores instructions executable by the processor to: receive user input comprising a potential wake word; determine whether the potential wake word is associated with a stored wake word; and responsive to determining that the potential wake word is associated with the stored wake word, activate, based on the potential wake word, a digital assistant associated with the information handling device.

A further aspect provides a product, comprising: a storage device that stores code, the code being executable by a processor and comprising: code that receives user input comprising a potential wake word; code that determines whether the potential wake word is associated with a stored wake word; and code that activates, based on the potential wake word and responsive to determining that the potential wake word is associated with the stored wake word, a digital assistant associated with the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
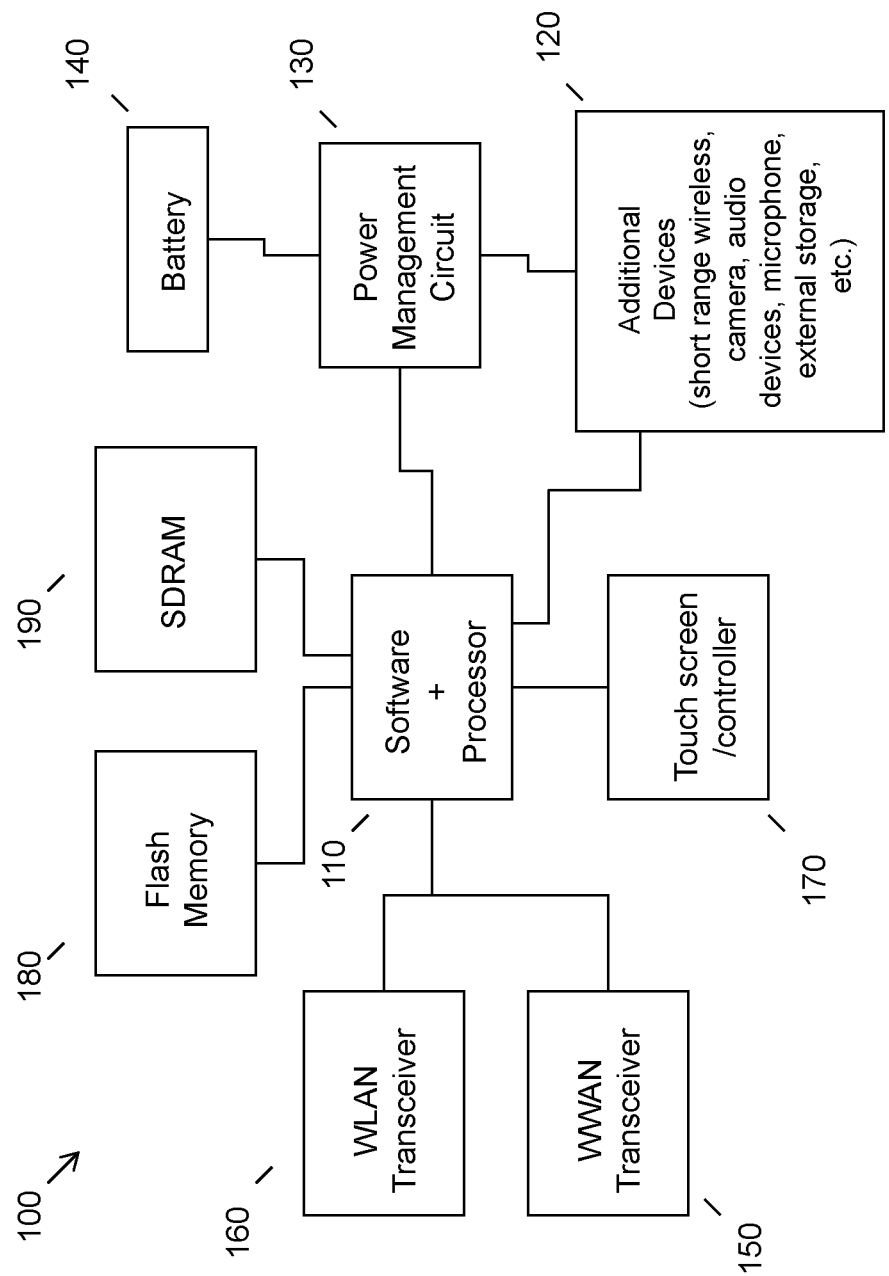
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different commands or queries. One method of interacting with a device is to use digital assistant software employed on the device (e.g., Siri® for Apple®, Cortana® for Windows®, Alexa® for Amazon®, etc.). Digital assistants are able to provide outputs (e.g., audible outputs, visual outputs, etc.) that are responsive to a variety of different types of user inputs (e.g., voice inputs, etc.).

Conventionally, prior to providing the command or query input, currently available commercial systems require the device to be "awoken", or activated, by a wake word or phrase provided by the user. For example, a user may say "Hey Siri" while using a device running iOS 8 or later or say "Alexa" while using a dedicated smart speaker such as the Echo®. Once a user provides a wake word, the device is activated and subsequently listens for voice commands following the wake word. However, certain individuals (e.g., children, second language speakers, persons having speech impediments, etc.) may not have a sufficient phonological inventory to properly speak particular wake words or phrases. For example, a child attempting to pronounce "Alexa" may instead say one of "Awexa", "Ahexa", "Ayexa", etc. because their phonological inventory is not fully developed. In another example, a native Mandarin Chinese speaker may pronounce "Alexa" as "Arexa" because Mandarin natives have no "l" phone in their phonological inventory. In both of these situations, the device will not consistently activate, which may lead to user delays as well as user frustration.

Currently, the only solution is to have a user set a chosen wake word or phrase. However, many users do not know how to set a non-default wake word or phrase. Additionally, users will have to take additional steps to modify the wake word. Finally, once the wake word has been modified, users have to know what the new wake word is in order to activate the digital assistant. This can cause problems in the cases where another user is using a digital assistant belonging to a different person or if the user forgets what the wake word or phrase has been set to.

Accordingly, an embodiment provides a method for expanding stored wake words/phrases with potential candidates that may be intended to wake the device. In an embodiment, user input comprising a potential wake word may be received at a device. The potential wake word may be, for example, a phonetic variation of a stored wake word. An embodiment may then determine whether the potential wake word is associated with a stored wake word and, responsive to determining an association, an embodiment may activate a digital assistant associated with the device. Such a method may enable a user who does not have a phonological capacity sufficient enough to pronounce a stored wake word to nevertheless efficiently activate a digital assistant associated with the device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
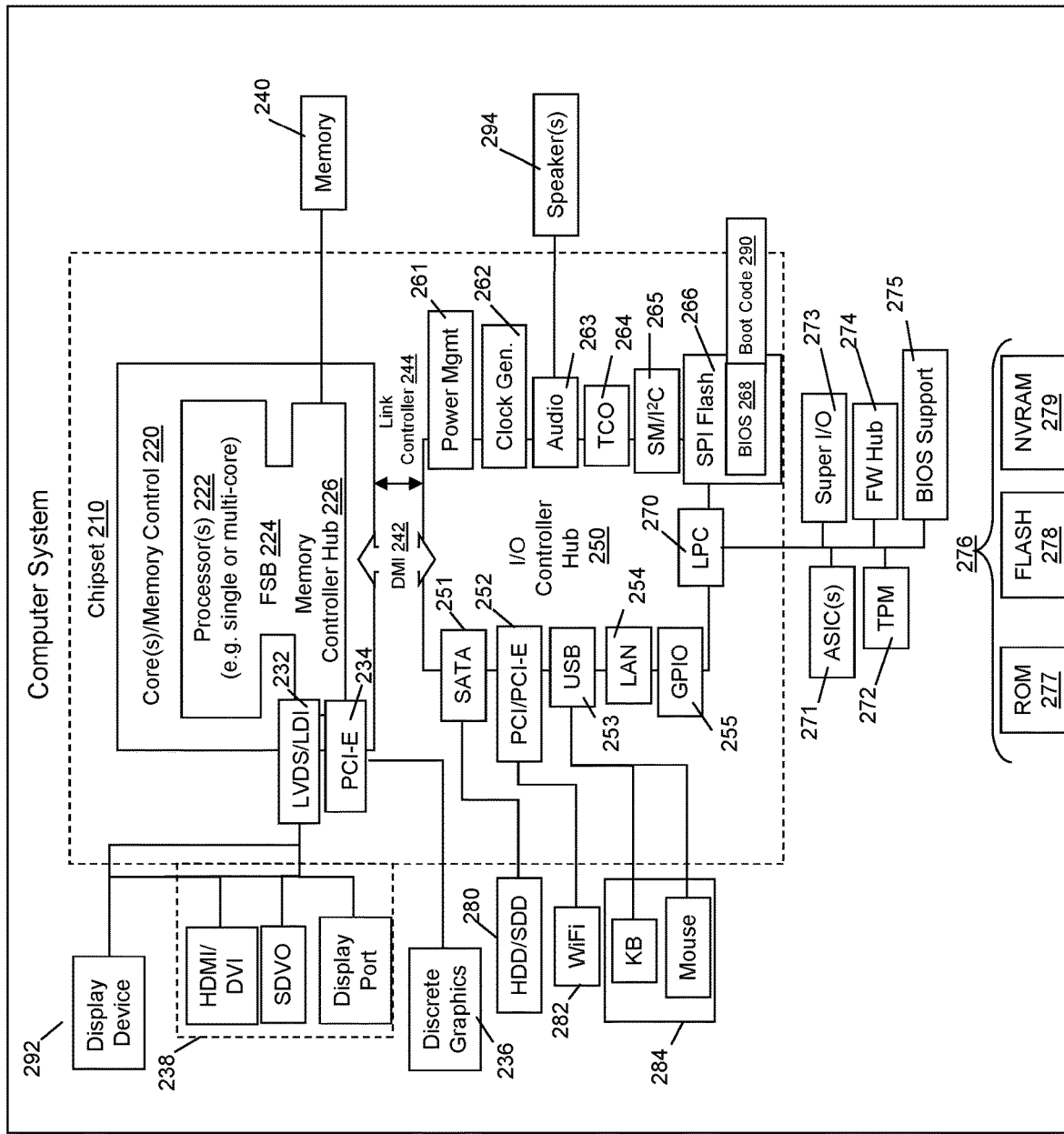
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
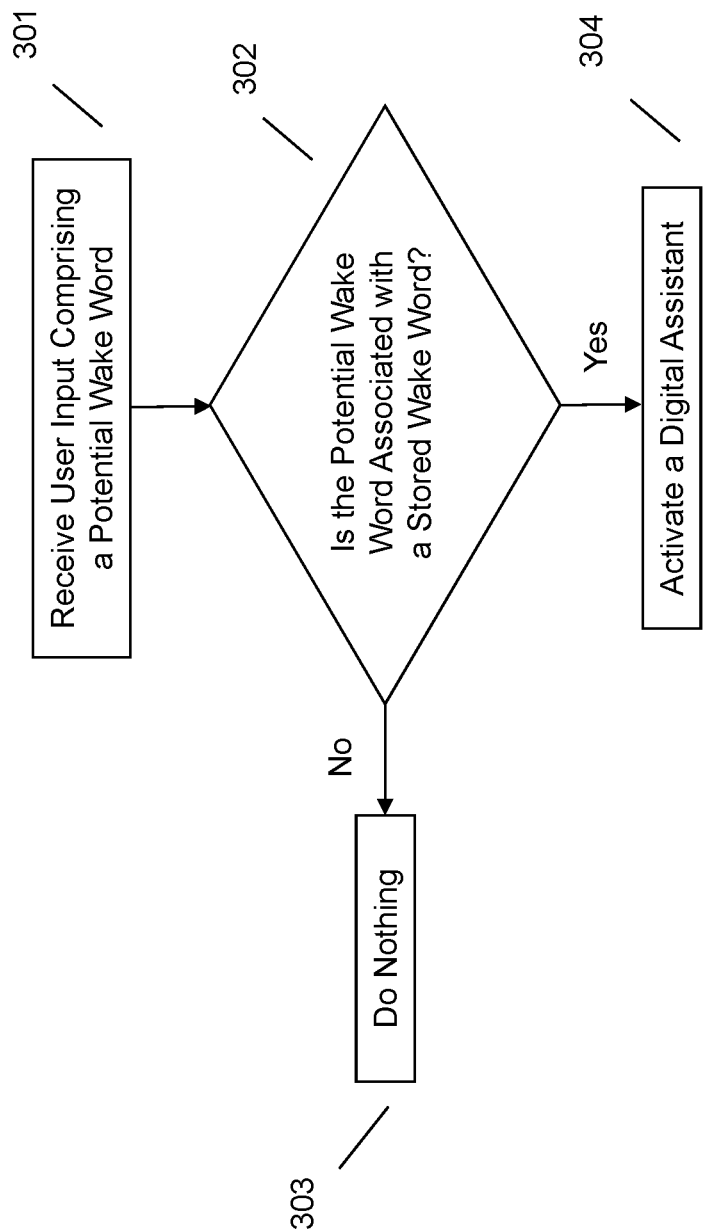
FIG. 3 illustrates an example method of activating a digital assistant based upon a determined association between a potential wake word and a stored wake word.

Referring now to FIG. 3, an embodiment may activate a digital assistant based upon determining an association between a potential wake word and a stored wake word. At 301, an embodiment may receive user input comprising a potential wake word. In an embodiment, the user input may be audible, voice input and may be received at an input device (e.g., a microphone, a speech capture device, etc.) associated with the device.

In an embodiment, the input device may be an input device integral to the information handling device. For example, a smart phone may be disposed with a microphone capable of receiving voice input data. Alternatively, the input device may be disposed on another device and may transmit received voice input data to the information handling device. For example, voice input may be received at a smart speaker that may subsequently transmit the voice data to another device (e.g., to a user's smartphone for processing, etc.). Voice input data may be communicated from other sources to the information handling device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

In an embodiment, the input device may be configured to continuously receive voice input data by maintaining the input device in an active state. The input device may, for example, continuously detect voice input data even when other sensors (e.g., cameras, light sensors, speakers, other microphones, etc.) associated with the information handling device are inactive. Alternatively, the input device may remain in an active state for a predetermined amount of time (e.g., 30 minutes, 1 hour, 2 hours, etc.). Subsequent to not receiving any voice input data during this predetermined time window, an embodiment may switch the input device to a power off state. The predetermined time window may be preconfigured by a manufacturer or, alternatively, may be configured and set by one or more users.

In an embodiment, the stored wake word may be any word, or phrase, capable of activating a digital assistant associated with a device and a potential wake word may be a user's attempt at trying to pronounce the stored wake word. As such, in an embodiment, the potential wake word may be a phonetic variation of a stored wake word. For example, the stored wake word may be "Alexa" or "Siri" and the potential wake word may share a degree of phonetic similarity with the stored wake word but with one or more identifiable differences (e.g., "Awexa", "Arexa", "Thiri", etc.). In an embodiment, the stored wake word may be stored in a database (e.g., cloud storage, remote storage, local storage, network storage, etc.) accessible by the digital assistant.

At 302, an embodiment may determine whether the potential wake word is associated with a stored wake word. Responsive to determining that the potential wake word is associated with the stored wake word an embodiment may activate, at 304, a digital assistant associated with the device. The techniques for determining an association between a potential wake word and a stored wake word are described in greater detail below. Responsive to determining, at 302, that the potential wake word is not associated with a stored wake word, an embodiment may, at 303, take no action. Alternatively, an embodiment may provide output requesting a user repeat the input, indicating that the embodiment did not understand the request, or the like.

In an embodiment, the determination may comprise comparing the potential wake word against a list of known variants associated with the stored wake word. The list of known variants may comprise a listing of words that are associated with common attempts to pronounce the stored wake word. For example, for a digital assistant with the wake word of "Alexa", a list of known variants may include the words "Arexa", "Awexa", and "Ahexa". Responsive to receiving a potential wake word that matches at least one of the words in the list, an embodiment may activate a digital assistant. In an embodiment, the list of known variants may come pre-loaded with the digital assistant or may be manually updated by a user. In one embodiment the list of known variants may be updated over time, for example, through crowd-sourcing where the list of stored variants are updated based upon additions from one or more other users, from the manufacturer or software developer, or the like.

In another embodiment, the list may be automatically updated without additional user input. For example, responsive to identifying that a potential wake word not in the stored list has been received multiple times (e.g., three or more times, etc.) within a predetermined time period (e.g., 30 seconds, 1 minute, etc.), an embodiment may determine that a user is attempting to pronounce the stored wake word. In this situation, if an embodiment determines (e.g., using speech analysis techniques, etc.) that the repeated potential wake word shares a degree of phonological similarity with the stored wake word (e.g., by sharing a predetermined number of characters with the stored wake word, by sharing a predetermined number of audible characteristics with the stored wake word, etc.), an embodiment may determine that the non-listed potential wake word is associated with the stored wake word and activate the corresponding digital assistant. Furthermore, an embodiment may then automatically store the non-listed potential wake word in the list of known variants responsive to determining an association. The non-listed potential wake word may also be provided to a third-party to be added to a list of crowd-sourced varients.

In an embodiment, the determination may comprise identifying a location of a user providing the user input and associating the potential wake word with the stored wake word based upon the identified location. The location identification may be done, for example, by utilizing one of a variety of known user localization techniques (e.g., using global positioning system (GPS) data, wireless triangulation, geo-fencing, user-provided location check-in on social media, and/or other user localization techniques known by those skilled in the art but not mentioned here). In an embodiment, the list of known variants may comprise words that are specific to an identified location and an embodiment may attempt to listen for those location-specific wake words responsive to identifying that a user is in the identified location. For example, for the stored wake word "Alexa," responsive to identifying that a user is in China, the list of known variants may contain the words "Arexa" and "Awexa" because those words are common mispronunciations of "Alexa" in that geographic region. Responsive to receiving a potential wake word that matches a word in the location-based list of known variants, an embodiment may associate the potential wake word with a stored wake word and subsequently activate a digital assistant. Similar techniques may be used based upon accent or dialect identification, age identification, or identifications of other characteristics of the user that may impact the pronunciation of a word by a user.

In an embodiment, the determination may comprise identifying whether additional user input is provided after the potential wake word. In an embodiment, the additional user input may be, for example, a user command that may be provided within a predetermined time period from uttering the wake word (e.g., 5 seconds, 10 seconds, etc.). For example, if a user provides the potential wake word "Awexa" followed by a recognizable command such as "give me directions home", an embodiment may determine that a user is attempting to activate a digital assistant to attain directions. An embodiment may have access to a stored list (e.g., stored locally, remotely, in the cloud, etc.) of common commands and responsive to identifying that a recognizable user command is provided within a predetermined time period after the potential wake word, an embodiment may associate the potential wake word with a stored wake word. If a potential wake word is provided by itself without a following command or additional user input, an embodiment may assign a low confidence to the word and not associate the potential wake word with the stored wake word.

The various embodiments described herein thus represent a technical improvement to conventional digital assistant activation techniques. Using the techniques described herein, an embodiment may receive user input comprising a potential wake word and then determine whether the potential wake word is associated with a stored wake word. Responsive to determining that the potential wake word is associated with the stored wake word, an embodiment may activate a digital assistant associated with the device. Such techniques allow users that have difficulty articulating a stored wake word associated with a digital assistant to nevertheless activate the digital assistant, regardless of whether they pronounced the stored wake word correctly or not.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, user input comprising a potential wake word;
   determining, using a processor, whether the potential wake word is associated with a stored wake word, wherein the potential wake word comprises a wake word being a variant of the stored wake word and sharing a degree of phonetic similarity and having identifiable differences to the stored wake word, wherein the determining comprises comparing the potential wake word against a list of known variants associated with the stored wake word, wherein the list of known variants is dynamically updated with potential wake words; and
   responsive to determining that the potential wake word is associated with the stored wake word, activating, based on the potential wake word, a digital assistant associated with the information handling device.

2. The method of claim 1, wherein the potential wake word is a phonetic variation of the stored wake word.

3. The method of claim 1, wherein the activating comprises activating the digital assistant responsive to matching the potential wake word with at least one known variant from the list of known variants.

4. The method of claim 1, wherein the receiving comprises receiving the potential wake word multiple times.

5. The method of claim 4, wherein the determining comprises determining that the potential wake is associated with the stored wake word based upon the receiving the potential wake word multiple times in a predetermined time period.

6. The method of claim 4, further comprising storing the potential wake word in a list of known variants associated with the stored wake word responsive to receiving the potential wake word multiple times.

7. The method of claim 1, wherein the determining comprises identifying, using location data, a location of a user providing the user input and associating the potential wake word with the stored wake word based upon the identified location.

8. The method of claim 1, wherein the determining comprises identifying whether additional user input, provided after the potential wake word, comprises a user command.

9. The method of claim 8, responsive to identifying that a user command is provided after the potential wake word, associating the potential wake word with a stored wake word.

10. The method of claim 1, wherein updating the list of known variants associated with a stored wake word comprises acquiring crowdsourced data, from one or more other users, to acquire stored wake word variants.

11. An information handling device, comprising:
a processor;
a memory device that stores instructions executable by the processor to:
receive user input comprising a potential wake word;
determine whether the potential wake word is associated with a stored wake word, wherein the potential wake word comprises a wake word being a variant of the stored wake word and sharing a degree of phonetic similarity and having identifiable differences to the stored wake word, wherein to determine comprises to compare the potential wake word against a list of known variants associated with the stored wake word, wherein the list of known variants is dynamically updated with potential wake words; and
responsive to determining that the potential wake word is associated with the stored wake word, activate, based on the potential wake word, a digital assistant associated with the information handling device.

12. The information handling device of claim 11, wherein the potential wake word is a phonetic variation of the stored wake word.

13. The information handling device of claim 11, wherein the instructions executable by the processor to activate comprise instructions executable by the processor to activate the digital assistant responsive to matching the potential wake word with at least one known variant from the list of known variants.

14. The information handling device of claim 11, wherein the instructions executable by the processor to receive comprise instructions executable by the processor to receive the potential wake word multiple times.

15. The information handling device of claim 14, wherein the instructions executable by the processor to determine comprise instructions executable by the processor to determine that the potential wake word is associated with the stored wake word based upon the instructions executable by the processor to receive the potential wake word multiple times in a predetermined time period.

16. The information handling device of claim 14, wherein the instructions are further executable by the processor to store the potential wake word in a list of known variants associated with the stored wake word responsive to receiving the potential wake word multiple times.

17. The information handling device of claim 11, wherein the instructions executable by the processor to determine comprise instructions executable by the processor to identify whether additional user input, provided after the potential wake word, comprises a user command.

18. The information handling device of claim 17, wherein the instructions are further executable by the processor to associate, responsive to identifying that a user command is provided after the potential wake word, the potential wake word with a stored wake word.

19. The information handling device of claim 11, updating the list of known variants associated with a stored wake word comprises acquiring crowdsourced data, from one or more other users, to acquire stored wake word variants.

20. A product, comprising:
a storage device that stores code, the code being executable by a processor and comprising:
code that receives user input comprising a potential wake word;
code that determines whether the potential wake word is associated with a stored wake word, wherein the potential wake word comprises a wake word being a variant of the stored wake word and sharing a degree of phonetic similarity and having identifiable differences to the stored wake word, wherein the code that determines comprises code that compares the potential wake word against a list of known variants associated with the stored wake word, wherein the list of known variants is dynamically updated with potential wake words; and
code that activates, based on the potential wake word and responsive to determining that the potential wake word is associated with the stored wake word, a digital assistant associated with the information handling device.

* * * * *